US011535157B2

(12) United States Patent
Minikey, Jr. et al.

(10) Patent No.: US 11,535,157 B2
(45) Date of Patent: Dec. 27, 2022

(54) REARVIEW DEVICE

(71) Applicant: GENTEX CORPORATION, Zeeland, MI (US)

(72) Inventors: Danny L. Minikey, Jr., Fenwick, MI (US); Eric S. Sloterbeek, Hudsonville, MI (US); Elliot M. Busta, Grand Rapids, MI (US); Christopher D. Pollack, Zeeland, MI (US); Jeffery E. Irvin, Holland, MI (US); Joel D. Geerlings, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 95 days.

(21) Appl. No.: 17/173,269

(22) Filed: Feb. 11, 2021

(65) Prior Publication Data

US 2021/0245661 A1    Aug. 12, 2021

Related U.S. Application Data

(60) Provisional application No. 62/972,925, filed on Feb. 11, 2020, provisional application No. 63/031,031, filed on May 28, 2020.

(51) Int. Cl.
*B60R 1/04*    (2006.01)
*B60R 1/12*    (2006.01)

(52) U.S. Cl.
CPC . *B60R 1/04* (2013.01); *B60R 1/12* (2013.01)

(58) Field of Classification Search
CPC .. B60R 1/04; B60R 1/12; B60R 11/00; B60R 2011/0003; B60R 2011/0042;

(Continued)

(56) References Cited

U.S. PATENT DOCUMENTS 9,598,016 B2 *  3/2017  Blank .................. G02B 5/0816
9,676,334 B2 *  6/2017  Cammenga ............. B60R 1/088
(Continued)

FOREIGN PATENT DOCUMENTS

EP      0667254 A1    8/1995

OTHER PUBLICATIONS

International Search Report dated Apr. 1, 2021, for corresponding PCT application No. PCT/US2021/017523, 2 pages.

(Continued)

*Primary Examiner* — Stephone B Allen
*Assistant Examiner* — Rahman Abdur
(74) *Attorney, Agent, or Firm* — Price Heneveld LLP; Brian James Brewer (57) ABSTRACT

A rearview device having a housing that defines a cavity. The rearview device additionally includes an electro-optic element. In some embodiments, the housing may comprise a peripheral flange. The peripheral flange may have a mounting surface and a lip. The electro-optic element may be associated with the mounting surface. Further, the lip may substantially circumscribe the electro-optic element. In other embodiments, the rearview device may further comprise a mounting assembly having one or more mechanical fastener acceptors. One or more mechanical fasteners may be received by the mechanical fastener acceptors and extend through holes both in a holder and a circuit board disposed in the cavity. In yet other embodiments, the one or more mechanical fasteners may be received by the mechanical fastener acceptors and extend through and be supported by a washer disposed in the cavity.

14 Claims, 11 Drawing Sheets

(58) Field of Classification Search
CPC ........... B60R 1/088; B60R 1/02; B60R 1/025;
B60R 1/00; B60R 1/006
USPC ........................................................ 359/871
See application file for complete search history.

(56) References Cited

U.S. PATENT DOCUMENTS

| | | | | |
|---|---|---|---|---|
| 2002/0159171 | A1* | 10/2002 | Schnell | B60R 1/025 |
| | | | | 359/872 |
| 2008/0225538 | A1* | 9/2008 | Lynam | G09G 3/3406 |
| | | | | 362/494 |
| 2010/0033857 | A1* | 2/2010 | Filipiak | B60R 1/04 |
| | | | | 359/872 |
| 2017/0120826 | A1* | 5/2017 | Minikey, Jr. | B60Q 3/258 |
| 2017/0297495 | A1* | 10/2017 | Lundy, Jr. | B60R 1/04 |

OTHER PUBLICATIONS

Written Opinion dated Apr. 1, 2021, for corresponding PCT application No. PCT/US2021/017523, 4 pages.

* cited by examiner

REARVIEW DEVICE

CROSS-REFERENCE TO RELATED APPLICATIONS

This application claims priority under 35 U.S.C. § 119(e) to U.S. Provisional Application No. 62/972,925 filed on Feb. 11, 2020, entitled "REARVIEW DEVICE," and U.S. Provisional Application No. 63/031,031 filed on May 28, 2020, entitled "REARVIEW DEVICE," the disclosures of which are hereby incorporated by reference in their entireties.

FIELD OF THE DISCLOSURE

The present disclosure generally relates to a rearview device and, more particularly, to a housing for a rearview device.

SUMMARY OF THE DISCLOSURE

According to one aspect of the present disclosure, a rearview assembly is disclosed. The rearview assembly may comprise a housing and an electro-optic element. The housing may have a body that defines a cavity and have a peripheral flange coupled to the body. The peripheral flange may have a mounting surface and a lip. The electro-optic element may be variably transmissive. Further, the electro-optic element may be associated with the mounting surface. Accordingly, the lip may substantially circumscribe the electro-optic element. In some embodiments, a foam layer may be coupled to each of and disposed between each of the mounting surface and the electro-optic element. In more embodiments, a front of the electro-optic element may be entirely visible relative a forward position of the rearview assembly. In yet other embodiments, a forward edge of the peripheral flange may be substantially flush with a front surface of the electro-optic element.

In some embodiments, the housing may further define a plurality of ribs. extending from a wall thereof. Each rib may comprise a substantially planar portion. Each substantially planar portion may be substantially co-planar with the mounting surface. Additionally, the substantially planar portions may extend from a substantially planar surface of the mounting surface.

In other embodiments, the rearview assembly may further comprise: a mounting assembly, a holder, a circuit board, and one or more mechanical fasteners. In such an embodiment, the housing may have one or more openings defined therein. The mounting assembly may have one or more mechanical fastener acceptors. In some such embodiments, the one or more mechanical fastener acceptors may extend, at least in part, through the one or more openings. The holder may comprise one or more first holes. In some embodiments, the holder may be disposed between the circuit board and the electro-optic element. Further, the holder may retain the circuit board within the cavity. The circuit board may comprise one or more second holes. Each mechanical fastener may extend through one of the one or more first holes and one of the one or more second holes and be received by one of the one or more mechanical fastener acceptors. In some such embodiments, each of the one more mechanical fasteners extend through one of the one or more openings.

In yet other embodiments, the rearview assembly may further comprise a mounting assembly and a washer. In such an embodiment, the housing may have one or more openings defined therein. The mounting assembly may have one or more mechanical fastener acceptors. In some such embodiments, the one or more mechanical fastener acceptors may extend, at least in part, through the one or more openings. The washer may be disposed in the cavity. In such an embodiment, the washer may be disposed between a circuit board disposed in the cavity and the one or more openings. Additionally, the washer may be operable to receive and support one or more mechanical fasteners. Each of the one or more mechanical fasteners received by one of the one or more mechanical fastener acceptors. In some such embodiments, each of the one more mechanical fasteners extend through one of the one or more openings.

In yet other embodiments, the lip may protrude from the mounting surface defining a recess. The protrusion may have a depth that corresponds to at least a thickness of the electro-optic element. Additionally, the depth may correspond to at least a combined thickens of the electro-optic element and a foam layer associated with the electro-optic element.

In accordance with another aspect of the present disclosure, a rearview assembly is disclosed. The rearview assembly may comprise an electro-optic element, a housing, a mounting assembly, a holder, a circuit board, and one or more mechanical fasteners. The electro-optic element may be variably transmissive. The housing may have a body that defines a cavity and has one or more openings. The mounting assembly may have one or more mechanical fastener acceptors. In some embodiments, the one or more mechanical fastener acceptors may extend, at least in part, through the one or more openings. The holder may comprise one or more first holes. Further, the holder may be disposed in the cavity. The circuit board may be disposed within the cavity and retained by the holder. The one or more mechanical fasteners may extend through the one or more first holes and the one or more second holes and be received by the one or more mechanical fastener acceptors. In some embodiments, the one more mechanical fasteners may extend, at least in part, through the one or more openings.

In accordance with another aspect of the present disclosure, a rearview assembly is disclosed. The rearview assembly may comprise an electro-optic element, a housing, a mounting assembly, a holder, a circuit board, a washer, and one or more mechanical fasteners. The electro-optic element may be variably transmissive. The housing may have a body that defines a cavity. Further, the housing may have one or more openings. The mounting assembly may have one or more mechanical fastener acceptors. In some embodiments, the one or more mechanical fastener acceptors may, at least in part, extend through the one or more openings. The circuit board may be disposed within the cavity. The holder may be disposed in the cavity and be operable to retain the circuit board. The washer may be disposed in the cavity. Further, the washer may be operable to receive and support the one or more mechanical fasteners. Additionally, the one or more mechanical fasteners may be received by the one or more mechanical fastener acceptors. In some embodiments, the one more mechanical fasteners may extend, at least in part, through the one or more openings.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a rearview device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
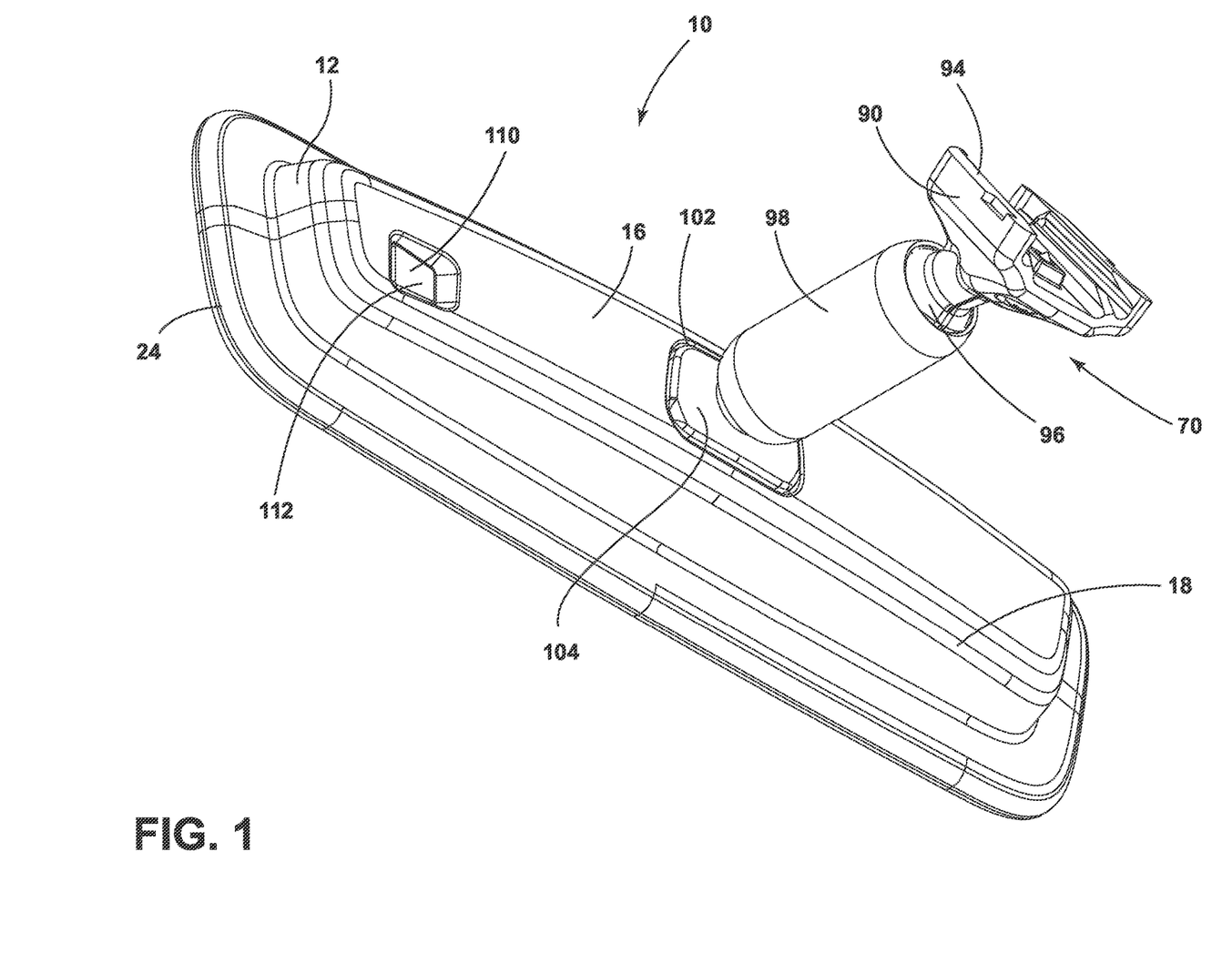
FIG. 1 is a bottom rear perspective view of a rearview device of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, a rearview device 10 is disclosed. Rearview device 10 may be associated with a vehicle and operable to provide a user with a view rearward relative the vehicle. Further, rearview device 10 may have a housing 12. The housing 12 may include a first side 14 and a second side 16 opposite the first side 14. In some embodiments, first side 14 may be disposed in a first direction 1 relative second side 14. The housing 12 may also include a body 18. The body 18 may define a cavity 20 and/or a peripheral flange 24 coupled to the body 18. The cavity 20 may have an aperture 21 along the first side 14 of the housing 12. Accordingly, the aperture 21 may be in the first direction 1 relative cavity 20. The peripheral flange 24 may be disposed in a peripheral manner about the aperture 21 on the first side 14. Further, the peripheral flange 24 may have a mounting surface 28 and define a lip 32 proximate to the mounting surface 28. The mounting surface 28 may be substantially planar. Additionally, the mounting surface 28 may be substantially co-planar with the aperture 21. Further, the mounting surface 28 may extend in a plane substantially perpendicular to first direction 1. The lip 32 may be disposed in a peripheral manner about the mounting surface 28. In some embodiments, lip 32 may extend from peripheral flange 24 in the first direction 1. Further, the lip 32 may have an inner surface. A foam layer 36 may be positioned proximate the lip 32 and coupled to the mounting surface 28. Accordingly, the lip 32 may be disposed about foam layer 36. In some embodiments, foam layer 36 may be in abutting contact with the inner surface of lip 32. Additionally, foam layer 36 may substantially occlude and/or be disposed in the aperture 21. The disposition of the foam layer 36 on mounting surface 36, accordingly, may cause foam layer 36 to be disposed in the first direction 1 relative the mounting surface 36. An electro-optic element 40 may positioned proximate the foam layer 36 and is associated with or coupled to, directly or indirectly, the mounting surface 36 and/or the lip 32 of the peripheral flange 24. Thus, electro-optic element 40 may be associated with and/or disposed on foam layer 36. Further, electro-optic element 40 may be disposed in the first direction 1 relative the foam layer 36. In general, the electro-optic element 40 may be coupled to the first side 14 of the housing 12 and substantially occlude aperture 21 when viewed from the first direction 1. In such embodiments, the lip 32 may substantially circumscribe the electro-optic element 40.

Figure 9:
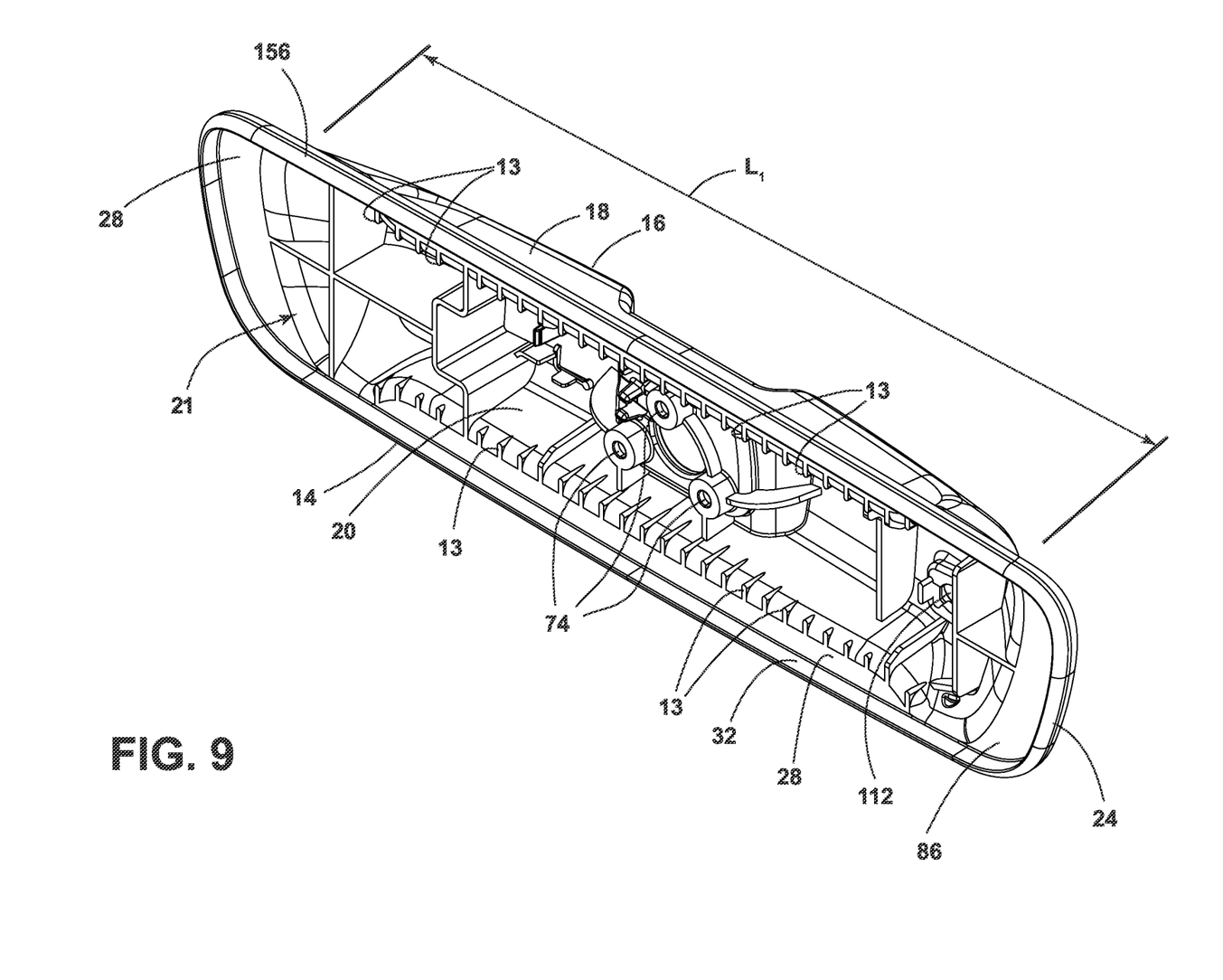
FIG. 9 is a perspective view of a housing of an embodiment of a rearview device of the present disclosure.

Additionally, in some embodiments, as shown in FIG. 9, the housing 12 may define a plurality of ribs 13 extending from a wall thereof. The wall may, at least in part, define the cavity 20. Further, each rib 13 may comprise a substantially planar portion. Furthermore, the each substantially planar portion of each rib 13 may be substantially co-planar one another. In some such embodiments, the substantially planar portions may be substantially co-planar with the mounting surface 28. Additionally, the substantially planar portions of ribs 13 may be extend from mounting surface 28, thereby serving as an extension thereof. In such an embodiment, the housing, or more specifically the wall, may diverge from the mounting surface 28 and the ribs 13 may extend the mounting surface 28 where the housing would otherwise be diverged. This may have the advantage of providing increased surface area for adhesion of elements with the mounting surface 28 and ribs 13 relative the surface area for adhesion to just the mounting surface 28 without ribs 13. The increase may be achieved for a given curvature of the housing 12 without having to substantially vary the thickness thereof. Accordingly, the body 18 of the housing 12 may have substantially uniform wallstock. Uniform wallstock in and of itself has known advantages of dimensional stability.

Figure 2:
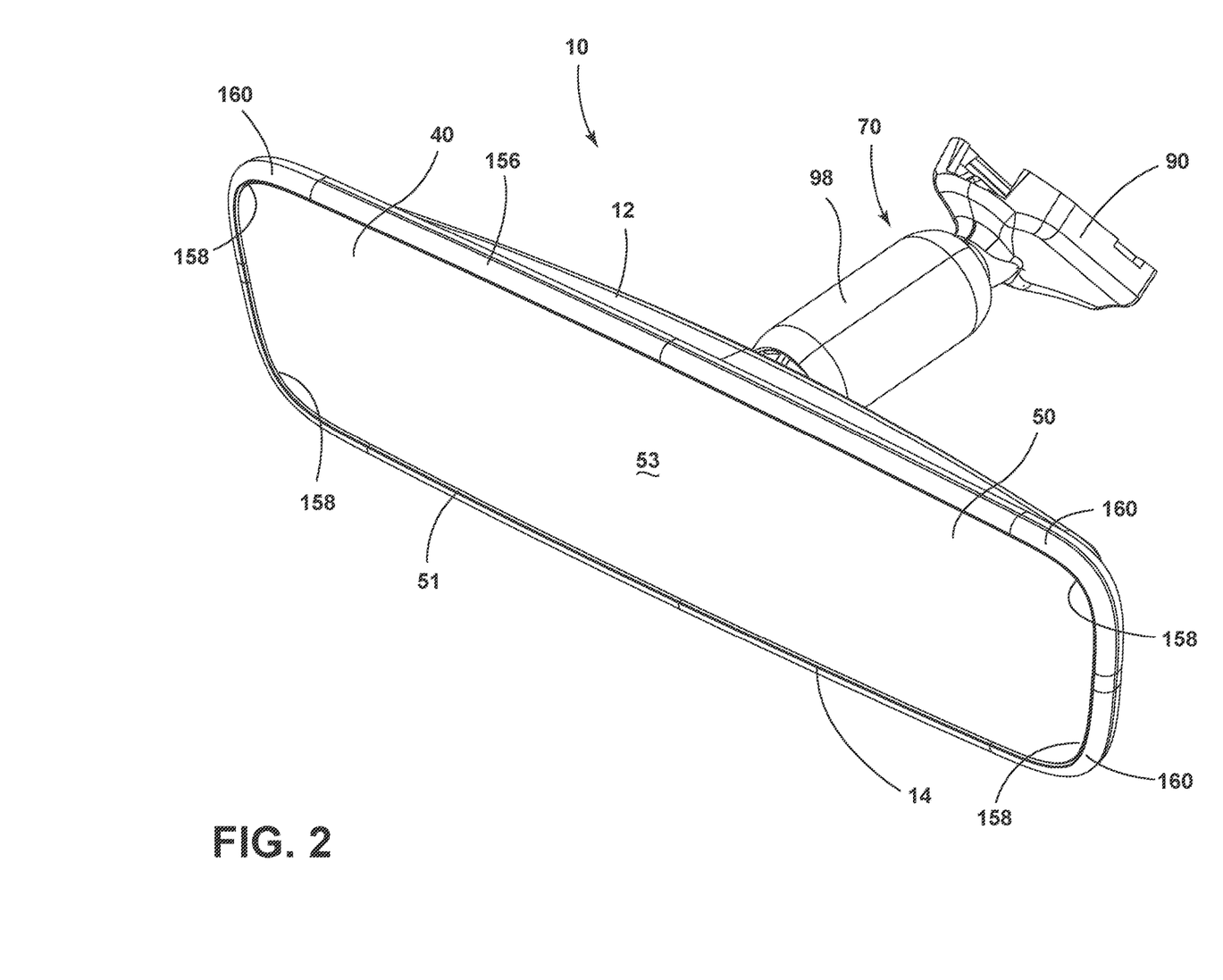
FIG. 2 is a top front perspective view of the rearview device of FIG. 1.
Figure 3:
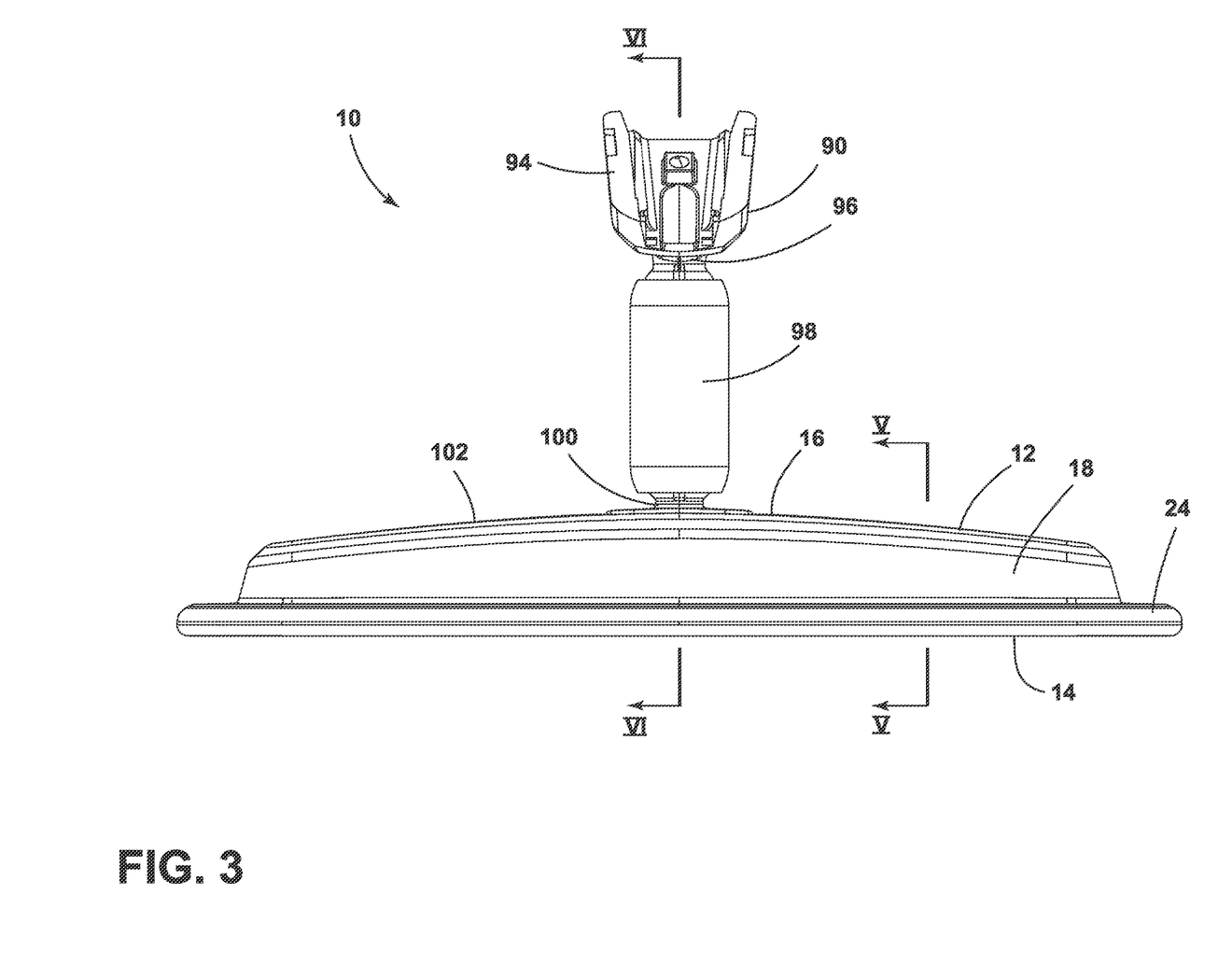
FIG. 3 is a top plan view of the rearview device of FIG. 1.

Referring now to FIGS. 1-2, the rearview device 10 may have a viewing area 50.

The viewing area 50 may correspond to a front surface of the rearview device 10 disposed substantially furthest in the first direction 1. Further, the viewing area 50 may have a variety of shapes. For example, the viewing area 50 may have a rectangular shape, a trapezoidal shape, or any custom contoured shape desired for aesthetic reasons. In some embodiments, the viewing area 50 may be defined, at least in part, by the electro-optic element 40. The electro-optic element 40 may include an edge treatment or a peripheral hiding layer 51, such as a chrome ring, discussed in more detail below. In general, the viewing area 50 of the rearview device 10 may be defined by the first side 14 of the housing 12 and/or the electro-optic element 40.

Figure 7:
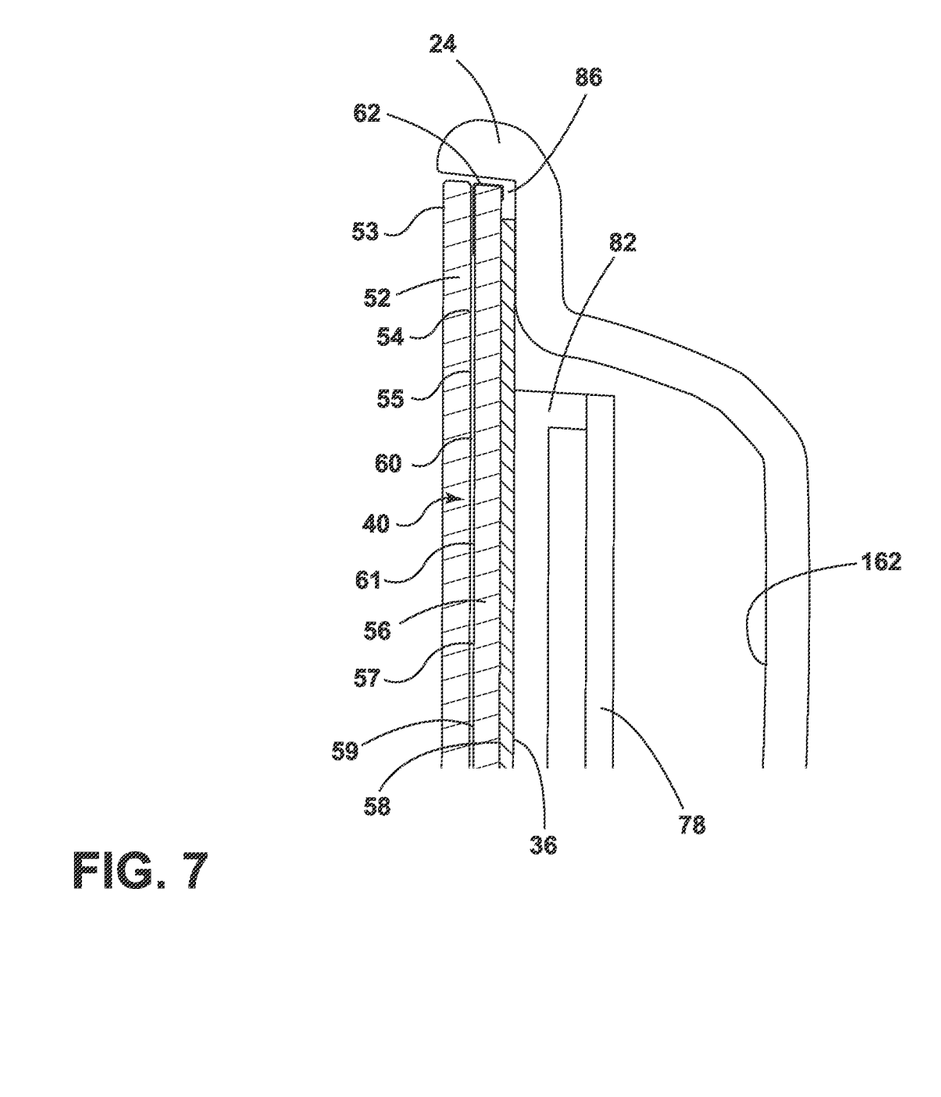
FIG. 7 is a partial top plan cross-sectional view of a portion of a rearview device of the present disclosure.
Figure 8:
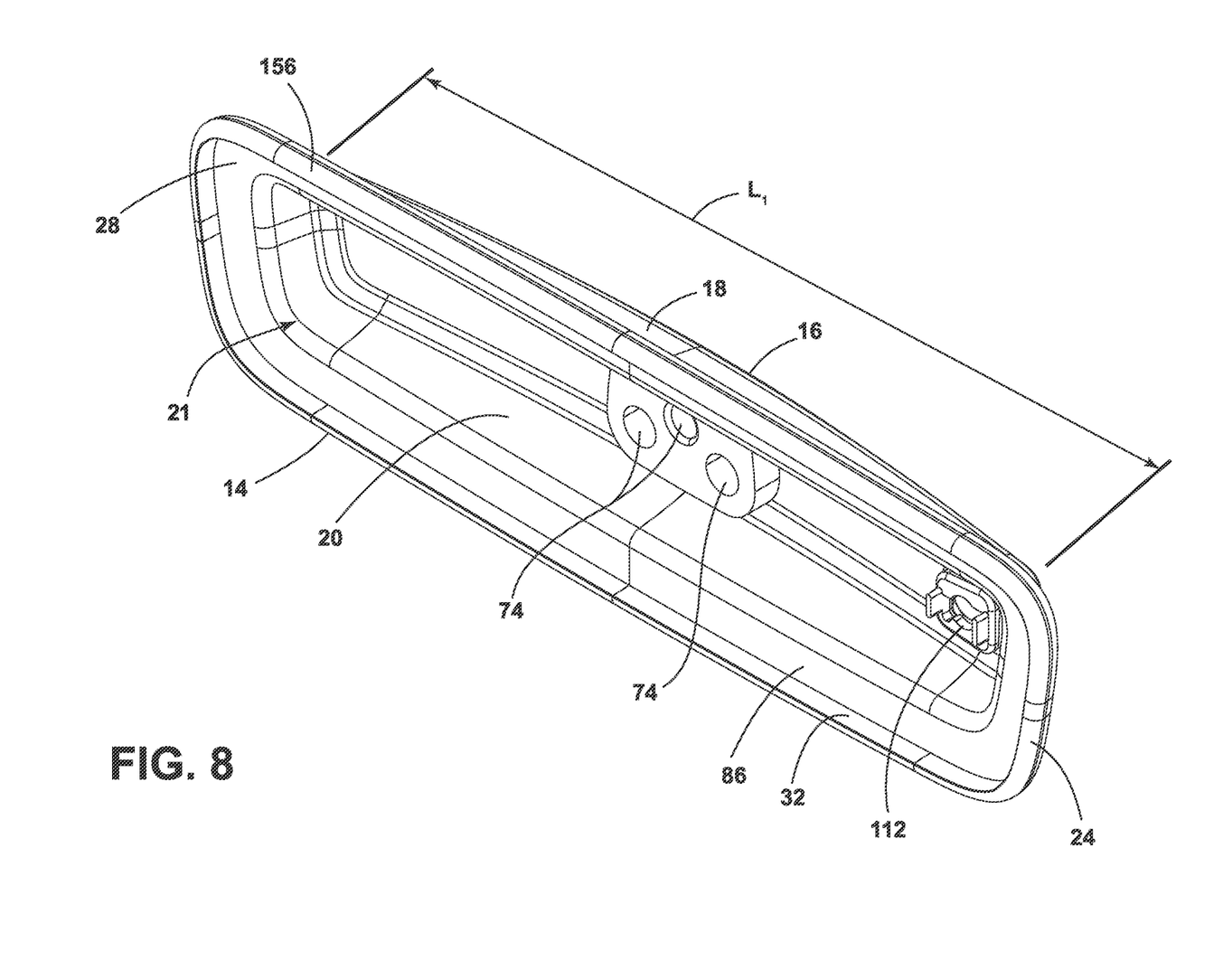
FIG. 8 is a top side perspective view of a housing of an embodiment of a rearview device of the present disclosure.

Referring now to FIGS. 2 and 7, the electro-optic element 40 may be secured within the housing 12. More specifically, the electro-optic element 40 may be secured within the aperture 21. The electro-optic element 40, as shown in FIG. 7, may include a first substrate 52 having first and second surfaces 53, 54, disposed on opposite sides thereof. Further, the first surface 53 may be disposed in the first direction 1 relative the second surface 54. Furthermore, the first substrate 52 may be substantially transparent. The second surface 54 may include a first electrically conductive layer 55. Additionally, the electro-optic element 40 may further include a second substrate 56. In some embodiments, second substrate 56 may also be substantially transparent. Additionally, second substrate 56 includes third and fourth surfaces 57, 58 disposed on opposite sides thereof. Further, the third surface 57 may be disposed in the first direction 1 relative the fourth surface 58. Additionally, the third surface 57 may include a second electrically conductive layer 59. The first and second electrically conducive layers 55, 59 may be substantially transparent in the visible and/or infrared regions of the electromagnetic spectrum. For example, the first and second electrically conductive layers may be fabricated from a transparent conductive oxide (TCO), such as fluorine doped tin oxide (FTO), tin doped indium oxide (ITO), doped zinc oxide, indium zinc oxide, or other materials known in the art.

A void 61 may be defined as between the first substrate 52 and the second substrate 56. Further, an electro-optic medium 60 may be disposed in the void 61. Accordingly, the electro-optic medium 60 may be disposed between the first and second electrically conductive layers 55, 59. In some embodiments, the electro-optic medium 60 may be disposed in one or more layers associated with the first and/or second electrically conductive layers 55, 59. In other embodiments, the electro-optic medium 60 may be dissolved in the solvent. Further, the electro-optic medium 60 may contain one or more electro-active materials and/or compounds. Electro-active may mean species of the medium may undergo a modification of its oxidation state upon exposure to a particular electrical potential difference. Accordingly, the electro-optic medium 60 is operable between activated and un-activated states based, at least in part, on exposure to a particular electrical potential. Further, the electro-optic medium may include electro-active anodic and cathodic materials. In some embodiments, activated and un-activated states of the anodic and/or cathodic species may correspond to states having varying degrees of transmissivity. The activated and un-activated states of the anodic and/or cathodic species may further correspond the activated and un-activated states of the electro-optic medium 60. Accordingly, in some embodiments, the anodic and/or cathodic species and the electro-optic medium 60 may be electrochromic. Electrochromic may mean a component that exhibits a change in its extinction coefficient at one or more wavelengths of the electromagnetic spectrum upon exposure to a particular electrical potential. Accordingly, upon application of a particular electric voltage or potential, a cathodic and/or anodic component may be activated, producing a change in absorbance at one or more wavelengths of the electromagnetic spectrum. The change in absorbance may be in the visible, ultra-violet, infra-red, and/or near infra-red regions. Thus, in some embodiments, the electro-optic medium 60 is operable between generally clear and darkened states. Further, the electro-optic medium may be fabricated from any one of a number of materials, including, for example, those disclosed in U.S. Pat. No. 6,433,914, entitled "Color-Stabilized Electrochromic Devices," which is herein incorporated by reference in its entirety.

To provide electric current to the electro-optic medium 60, element clips 62 may be provided on opposing sides of the first substrate 52 and the second substrate 56, to generate an electrical potential therebetween. The element clips 62, such as J-clips, may be electrically engaged with each electrical element, and element wires may extend from the element clips 62 to a printed circuit board 78. Additionally or alternatively, a bus bar may be disposed between the first substantially transparent substrate 52 and the second substantially transparent substrate 56.

In addition, a display device may be disposed behind the electro-optic element 40. Accordingly, the display device may be disposed in a second direction 2 relative the electro-optic element 40. The second direction 2 may be defined as a direction opposite the first direction 1.

Figure 4A:
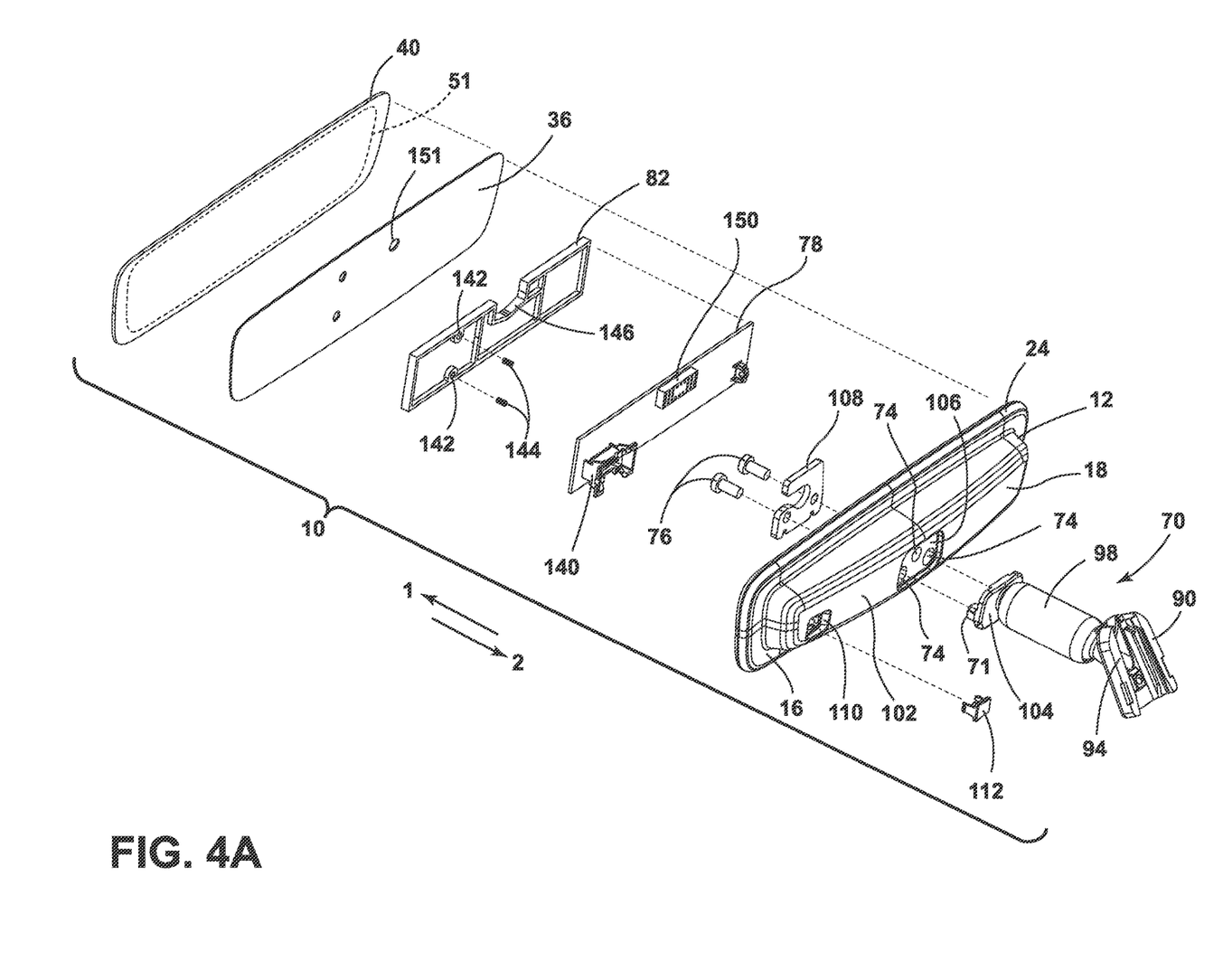
FIG. 4a is a top rear exploded perspective view of an embodiment of a rearview device of the present disclosure.
Figure 4B:
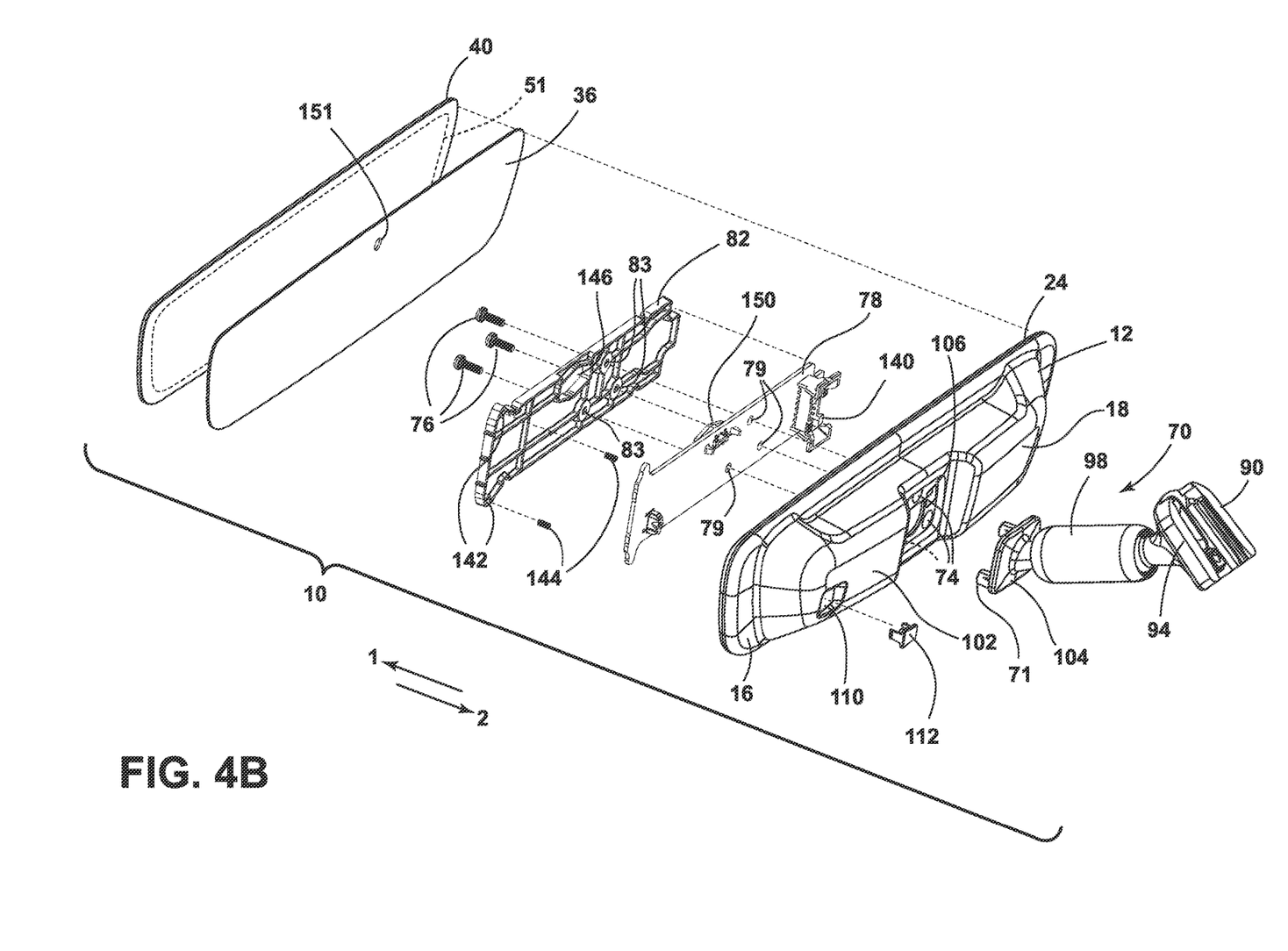
FIG. 4b is a top rear exploded perspective view of an embodiment of a rearview device of the present disclosure.
Figure 5:
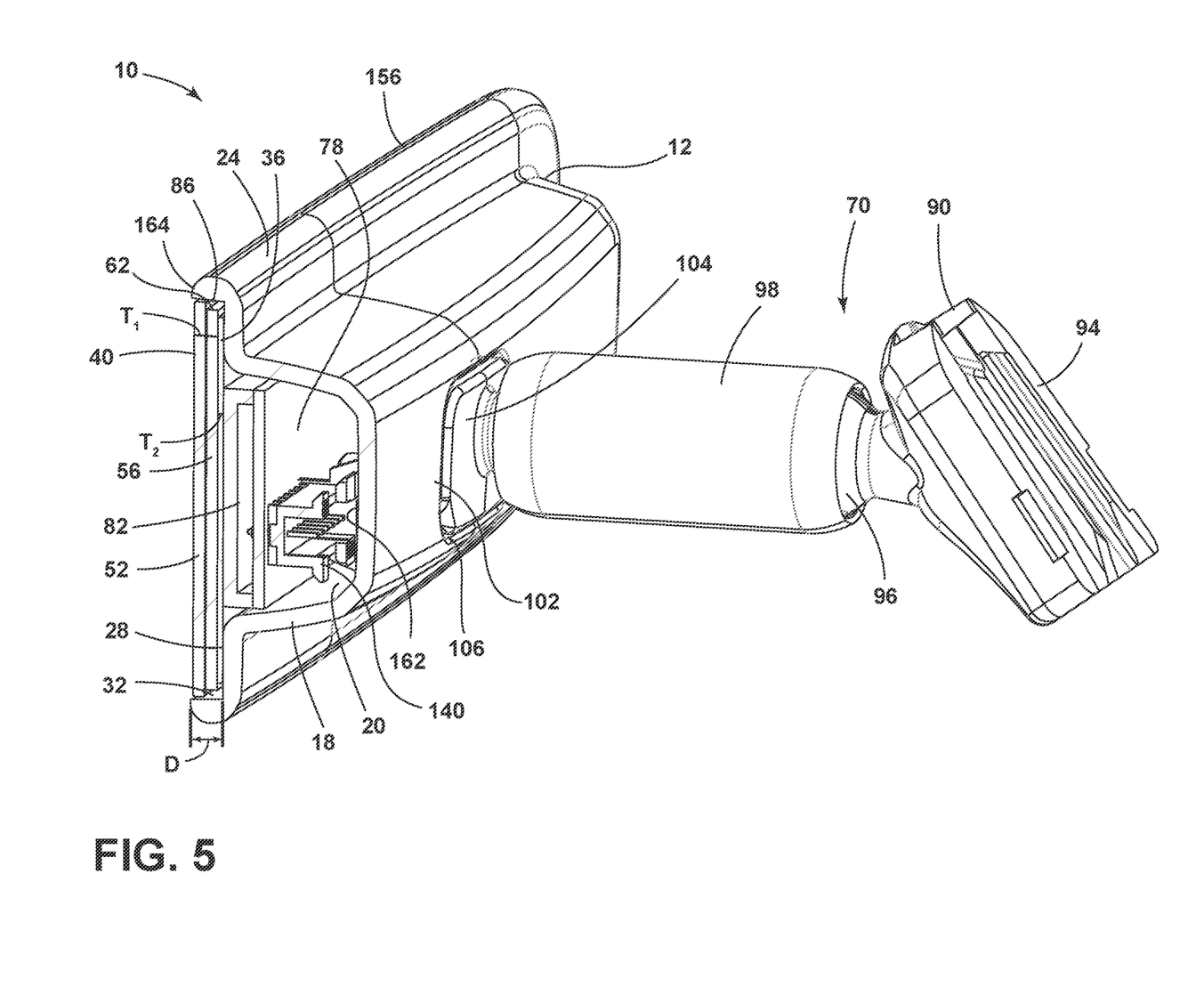
FIG. 5 is a side perspective cross-sectional view of a housing of the present disclosure for a rearview device.
Figure 6A:
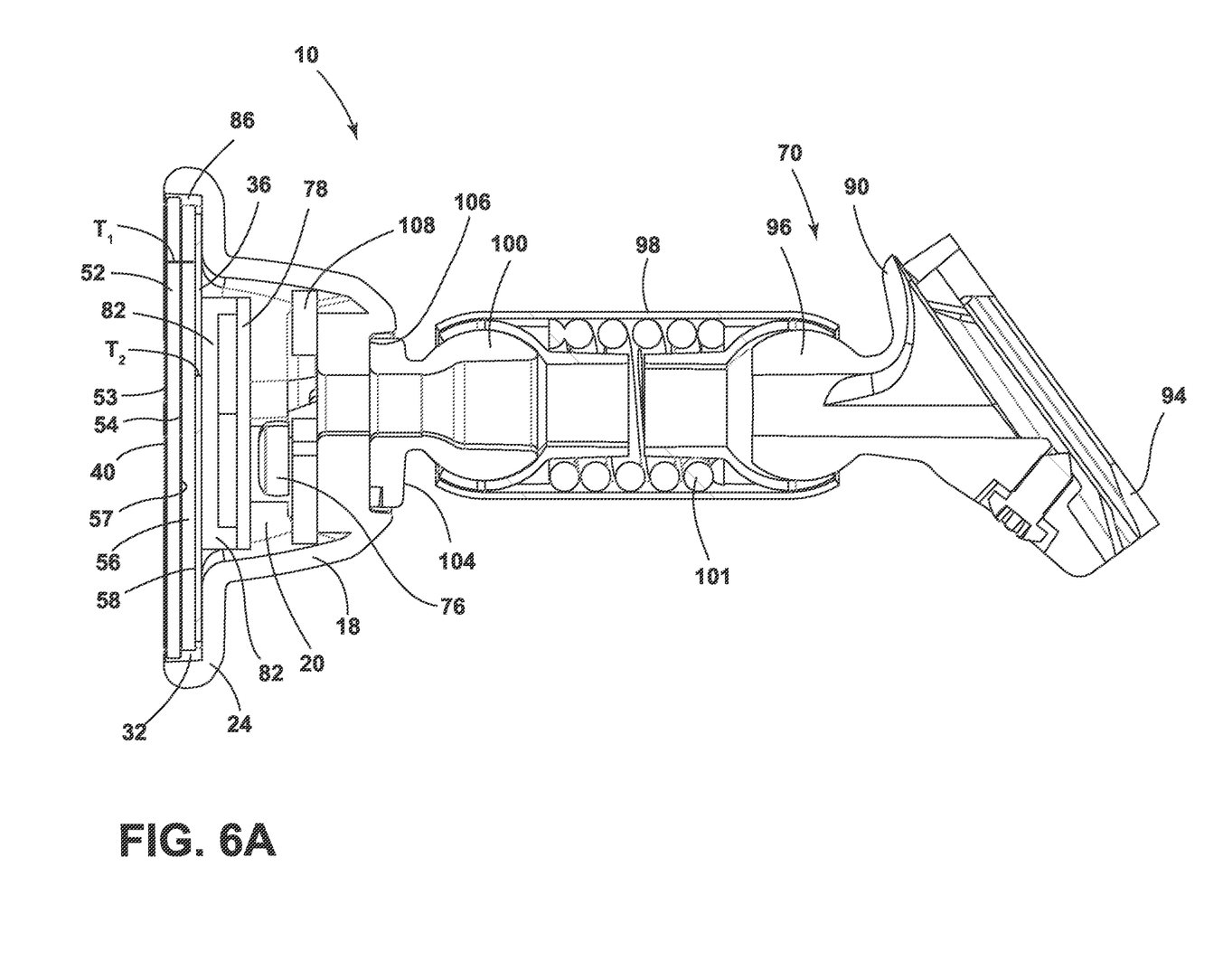
FIG. 6a is a side elevational cross-sectional view of an embodiment of a rearview device of the present disclosure.
Figure 6B:
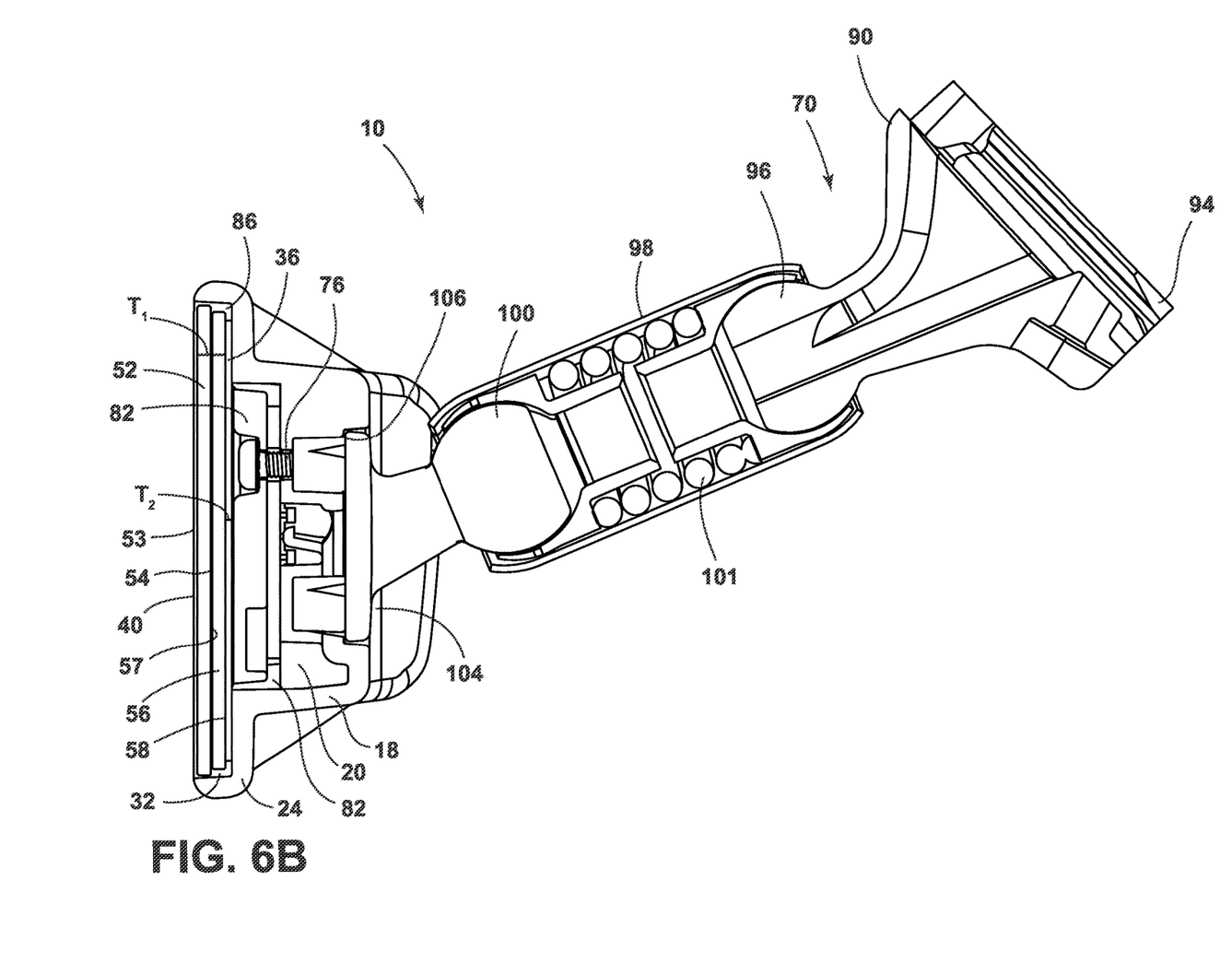
FIG. 6b is a side elevational cross-sectional view of an embodiment of a rearview device of the present disclosure.

With further reference to FIGS. 4a-5, the rearview device 10 is shown with components of the rearview device 10 partially exploded. The housing 12 is illustrated with the body 18 disposed proximate to a mounting assembly 70. More specifically, the mounting assembly 70 is disposed proximate the second side 16 of the housing 12. Further, the housing 12 and/or the second side 16 of the housing 16 may define one or more openings 74. The one or more openings 74 may provide a passage to cavity 20. The mounting assembly 70 may be substantially aligned with and/or occlude the one or more openings 74 when viewed from the second direction 2. More specifically, the alignment of the mounting assembly 70 with the one or more openings 74 may correspond to an alignment of one or more mechanical fastener acceptors 71 of the mounting assembly 70 with the one or more openings 74. A mechanical fastener acceptor 71 may a member operable to accept and secure a mechanical fastener 76. For example, mechanical fastener acceptor 71 may comprise a threaded opening operable to accept a mechanical fastener 76 or a flange with an opening through which a mechanical fastener 76 may extend and be secured by a nut or other mechanism. In some embodiments, the mounting assembly 70 may extend, at least in part, through the one or more openings 74. More specifically, the one or more mechanical fastener acceptors 71 and/or the one or more mechanical fasteners 76 may extend through the one or more openings 74. Accordingly, the mounting assembly 70 may be coupled to the body 18 of the housing 12 via one or more mechanical fasteners 76.

Additionally, a printed circuit board 78 may be disposed in the cavity 20 of the body 18 of the housing 12. In some embodiments, the printed circuit board 78 may be disposed proximate the front side or first side 14 of the housing 12. Thus, the printed circuit board may be is disposed behind and communicatively coupled with the electro-optic element 40, which is disposed proximate to the first side 14 (FIG. 8) of the housing 12. Further, the printed circuit board 78 may be disposed between the electro-optic element 40 and the one or more openings 74. As such, the printed circuit board 78 is disposed in the second direction 2 relative the electro-optic element 40 and in the first direction 1 relative the one or more openings 74. Additionally, the printed circuit board 78 may be generally coupled to the body 18 via electrical circuitry via an electrical receiver 140. Further, the printed circuit board 78 may generally retained within the cavity 20 of the body 18 by a holder 82. Accordingly, holder 82 may be disposed within cavity 20. The holder 82 may be an element operable to support the printed circuit board 78. In some embodiments, the holder 82 may be disposed between the printed circuit board 78 and the electro-optic element 40. Therefore, the holder 82 may be disposed in the first direction 1 relative the printed circuit board and in the second direction 2 relative the electro-optic element 40. Additionally, holder 82 may define a pair of openings 142 through which resilient pins 144 may extend to communicatively couple the printed circuit board 78 to the electro-optic element 40. Further, the holder 82, as illustrated, may having the same general dimensions as the printed circuit board 78.

As shown in FIG. 4a, in some embodiments, the one or more mechanical fasteners 76 may extend through a washer 108. The washer 108 may be disposed in cavity 20. Further, the washer 108 is operable to support and receive the one or more mechanical fasteners 76. Additionally, the washer 108 may be disposed between the printed circuit board 78 and/or the holder 82 and the one or more openings. Thus, washer 108 may be disposed in the second direction 2 relative the printed circuit board 78 and/or the holder 82 and in the first direction 1 relative the one or more openings 74. Further, the one or more mechanical fasteners 76 may be received by the one or more mechanical fastener acceptors 71 of mounting assembly 70. In some such embodiments, the one or more mechanical fasteners 76 may further extend through openings 74 defined by body 18.

As shown in FIG. 4b, in other embodiments, the one or more mechanical fasteners 76 may extend through one or more first holes 83 and one or more second holes 79. The one or more first holes 83 may be defined by holder 82. The one or more second holes 79 may be defined by printed circuit board 78. Accordingly, the one or more mechanical fasteners 76 may secure holder 82 and printed circuit board 78 within cavity 20. Further, the one or more mechanical fasteners 76 may be received by mounting assembly 70 via the one or more mechanical fastener acceptors 71. In some further embodiments, the one or more mechanical fasteners 76 may further extend through openings 74 defined by body 18.

Additionally, a foam layer 36 may generally cover a side of the printed circuit board 78 and/or the holder 82. The foam layer 36 may at least partially form a barrier between the holder 82 and the electro-optic element 40. Thus, foam layer 36 may be disposed in the second direction 2 relative the electro-optic element 40 and in the first direction 1 relative the printed circuit board 78 and/or the holder 82. The foam layer 36 may minimize vibration, which in turn may minimize potential buzzing, squeaking, and rattling within the rearview device 10. Additionally, adhesives, epoxies, or other bonding agents may be dispensed on the foam layer 36 to bind the foam layer 36 to the holder 82 and/or the electro-optic element 40. Alternatively, the adhesives, epoxies, or other bonding agents may be disposed between the electro-optic element 40 and the holder 82 in place of the foam layer 36 to at least partially form a barrier and bind the holder 82 to the electro-optic element 40. More specifically, the foam layer 36 may be associated with the third surface 58. Further, the foam layer 36 may be positioned in the front recess 86, between the holder 82 and the electro-optic element 40. Accordingly, the foam layer 36 may be disposed on the mounting surface 28. The electro-optic element 40 may also positioned within the front recess 86 and abut the foam layer 36. Further, the electro-optic element 40 may coupled to the lip 32 of the peripheral flange 24 and/or indirectly to the mounting surface 28 via the foam layer 36, such that the peripheral flange 24 and the electro-optic element 40 are generally coplanar. The generally coplanar nature of the peripheral flange 24 and the electro-optic element 40 may be achieved by their furthest extents in the first direction 1 being substantially coplanar.

Referring again to FIGS. 1-4b and 6, the mounting assembly 70 is disposed outside the housing 12. Further, mounting assembly 70 may have a mount 90 configured to engage a windshield button. The windshield button may be generally secured via an adhesive or other method of connection to a windshield of a vehicle. Accordingly, the mounting assembly 70 may be operable to engage a windshield. Thus, the mounting assembly 70 is operable to secure the rearview device 10 to the vehicle. The mount 90 may include a base 94 and a mount ball 96 that projects from the base 94 in the first direction 1. In some embodiments, the mount ball 96 may be received by a mount barrel 98. The mount barrel 98 may include a spring 101 that may directly or indirectly provide frictional resistance within the mount barrel 98 between at least the mount ball 96 and a rear portion 102 of the rearview device 10. Accordingly, the mount barrel 98 may engage the mount ball 96 of the mount 90. Further, the mount barrel 98 may engage a device ball 100 that may be operably coupled with the rear portion 102 of the rearview device 10. The device ball 100 may include an engagement portion 104 configured to be secured with a mounting area 106 of the housing 12 of the rearview device 10 including a receiving member (socket). The engagement portion 104 may comprise the one or more mechanical fastener acceptors. The mounting area 106 may comprise the one or more openings 76. The one or more mechanical fasteners 76 may secure the mounting assembly 70 to the rear side or second side 16 of the housing 12. Accordingly, the device ball 100 (FIG. 6) may be secured to the rear side or second side 16 of the housing 12 via the one or more mechanical fasteners 76. It will also be understood that the mounting assembly 70 may be a single ball mount in which the rear portion 102 of the rearview device 10 directly engages the mount ball 96 of the mount 90.

With reference to FIGS. 4a-b, the rear portion 102 of the rearview device 10 may define an aperture 110 that may receive an ambient light sensor lens 112. The aperture 110 may allow for the ambient light sensor lens 112 to receive and communicate light to an ambient light sensor. Accordingly, the ambient light sensor may provide data to the printed circuit board 78 related to an ambient lighting condition. The ambient light sensor may be disposed in cavity 20. In some embodiments, the ambient light sensor may additionally be disposed on the printed circuit board 78.

In some embodiments, the holder 82 may define a recessed edge (FIG. 4a) or opening (FIG. 4b) 146 positioned proximate to a glare sensor 150 of the printed circuit board 78, to allow for the optical receipt of light from the first direction 1. Accordingly, the recessed edge or opening 146 may be disposed in the first direction 1 relative the glare sensor 150. The foam layer 36 may similarly define a hole 151 proximate to the recessed edge 146 through which light may pass to the glare sensor 150 of the printed circuit board 78. Thus, the hole 151 may likewise be disposed in the first direction 1 relative the glare sensor 150. The glare sensor 150 may receive light from headlamps of a trailing vehicle (i.e. a vehicle in the first direction 1 relative the rearview device 10), and may measure light levels, which may correlate to glare visible on the electro-optic element 40, and communicate a corresponding signal. The signal may be communicated to the printed circuit board 78. Accordingly, the reflectance of the rearview device 10 may be optimized based, at least in part, on the signal. In some embodiments, the vertical/horizontal pattern of the glare sensor 150 may be symmetrical. Thus, the orientation of the glare sensor 150 may not be significant.

In general, the printed circuit board 78 and/or other circuitry, as well as any other components that are made available for the rearview device 10, may all be provided in the body 18 of the housing 12 and therefore not extend beyond the peripheral flange 24 of the rearview device 10. However, it is contemplated that, in some embodiments, additional room may be gained between the electro-optic element 40 and the peripheral flange 24 of the housing 12.

Referring now to FIGS. 2 and 5-8, the housing 12 may extend from the rear portion 102 of the rearview device 10 to a forward portion 156 of the rearview device 10 and include the body 18 and the peripheral flange 24. The peripheral flange 24 may include the lip 32 both of which may define the front recess 86 of the housing 12. The front recess 86 may be configured to receive the electro-optic element 40. It will generally be understood that the electro-optic element 40 could be replaced with a prism-type element or another display-type element suitable for use in providing a rear view to an occupant in a vehicle. The electro-optic element 40 may generally include a plurality of rounded corners 158 that may be generally complementary in shape to rounded corners 160 of the peripheral flange 24.

The peripheral flange 24 and the body 18 may be integrally formed with one another to form the housing 12, such that the peripheral flange 24, lip 32, and the body 18 are formed from a single piece of material. Stated differently, the body 18, the peripheral flange 24, and the lip 32 may be a single unitary construction made of a homogenous, uninterrupted material. Thus, it is generally contemplated that the housing 12 may be formed from injection molding, such that the body 18 and the peripheral flange 24 form the monolithic structure that is the housing 12. In forming the housing 12, the rear portion 102 of the rearview device 10, which generally corresponds with the body 18 of the housing 12, may include a generally curved design. Stated differently, the body 18 is depicted with an arced curvature along a length $L_1$ of the body 18, such that a rear wall 162 of the body 18 includes the general curved design described with respect to the rear portion 102 of the housing 12.

With further reference to FIGS. 4a-8, the peripheral flange 24 may extend outwardly from the body 18 to define the mounting surface 28. In addition, the lip 32 of the peripheral flange 24 may protrudes outwardly from the mounting surface 28 to define the front recess 86. The protrusion of the lip 32 may have a depth D outward from the mounting surface 28 in the first direction 1 that corresponds to at least a thickness $T_1$ of the electro-optic element 40 and a thickness $T_2$ of the foam layer 36, as best illustrated in FIGS. 6a-b. The lip 32 may generally retain the electro-optic element 40 and the foam layer 36 within the front recess 86, while the peripheral flange 24 may frame the electro-optic element 40. The framing of the electro-optic element 40 by the peripheral flange 24 may be to the extent that the electro-optic element 40 is coplanar with the peripheral flange 24. Thus, the electro-optic element 40 may be free from a wrapping engagement with the peripheral flange 24, such that the first surface 53 of the electro-optic element 40 is entirely visible relative the forward portion 156 of the rearview device 10. In other words, the peripheral flange 24 and/or housing, may not extend onto the first surface 53 or occlude the first surface 53 when viewed from the first direction 1. As such, the rearview device 10 may not have a bezel that wraps around the front of the electro-optic element. It is generally contemplated that the electro-optic element 40 may be coupled to the lip 32 via an adhesive material, or similar retention element known in the art.

A forward edge 164 of the peripheral flange 24 may be configured so that the forward edge 164 (i.e. the edge furthest in the first direction 1) of the peripheral flange 24 is flush with the first surface 53. Alternatively, the first surface 53 may be recessed slightly rearward of the forward edge 164. In other words, the first surface 53 may be disposed in a plane slightly in the second direction 2 relative the forward edge 164. A portion of the forward edge 164 may be planar, curved, round, etc. Regardless, the electro-optic element 40 may be free from obstruction by the forward edge 164 of the peripheral flange 24. Additionally, because the electro-optic element 40 is disposed within the front recess 86 and coupled to the lip 32, the rearview device 10 may be free of a separate peripheral bezel. As a result, the element clips 62 may otherwise be visible through the first substrate 54. However, the peripheral hiding layer 51 may be disposed around a perimeter of the electro-optic element 40 concealing the element clips 62 and/or a bus bar that may be used to activate the electro-optic medium 60. As mentioned above, it is contemplated that the peripheral hiding layer 51 may be a chrome ring edge disposed around the perimeter of the electro-optic element 40. The peripheral hiding layer 51 may be disposed on the second surface 54 of the first substrate 52. As depicted in FIG. 4, the peripheral hiding layer 51 may generally form a border of the electro-optic element 40 proximate to the peripheral flange 24.

The lack of a bezel and the free-floating appearance of the electro-optic element 40 may provide an improved interior aesthetic of the vehicle. In addition, the sleek, compact curvature of the body 18 of the housing 12 may further improve the overall appearance of the rearview device 10.

One non-limiting example of an electro-optic element includes an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Preselected Color," U.S. Pat. No. 6,037,471 entitled "Electrochromic Compounds," U.S. Pat. No. 6,141,137 entitled "Electrochromic Media For Producing A Pre-selected Color," U.S. Pat. No. 6,241,916 entitled "Electrochromic System," U.S. Pat. No. 6,193,912 entitled "Near Infrared-Absorbing Electrochromic Compounds And Devices Comprising Same," U.S. Pat. No. 6,249,369 entitled "Coupled Electrochromic Compounds With Photostable Dication Oxidation States," and U.S. Pat. No. 6,137,620 entitled "Electrochromic Media With Concentration Enhanced Stability, Process For The Preparation Thereof and Use In Electrochromic Devices"; U.S. Pat. No. 6,519,072, entitled "Electrochromic Device"; and International Patent Application Serial Nos. PCT/US98/05570 entitled "Electrochromic Polymeric Solid Films, Manufacturing Electrochromic Devices Using Such Solid Films, And Processes For Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, And Processes For Making Such Solid Films And Devices," which are herein incorporated by reference in their entirety. The glass element may also be any other element having partially reflective, partially transmissive properties.

The present disclosure may be used with a rearview assembly such as that described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

In this document, relational terms, such as "first," "second," and the like, are used solely to distinguish one entity or action from another entity or action, without necessarily requiring or implying any actual such relationship or order between such entities or actions.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A rearview assembly comprising:
   a housing having a body that defines a cavity and a peripheral flange coupled to the body, the peripheral flange having a mounting surface and a lip; and
   a variably transmissive electro-optic element associated with the mounting surface;
   one or more opening defined by the housing;
   a mounting assembly having one or more mechanical fastener acceptor;
   a holder comprising one or more first holes, the holder retaining a circuit board within the cavity, the circuit board comprising one or more second holes; and
   a one or more mechanical fasteners, each mechanical fastener extending through one of the one or more first holes and one of the one or more second holes and received by one of the one or more mechanical fastener acceptors;
   wherein the lip substantially circumscribes the electro-optic element.

2. The rearview assembly of claim 1, wherein the housing further defines a plurality of ribs extending from a wall thereof, each rib comprising a substantially planar portion, each substantially planar portion substantially co-planar with the mounting surface.

3. The rearview assembly of claim 2, wherein the substantially planar portions extend from a substantially planar surface of the mounting surface.

4. The rearview assembly of claim 1, wherein a foam layer is coupled to each of and disposed between each of the mounting surface and the electro-optic element.

5. The rearview assembly of claim 1, wherein each of the one or more mechanical fastener acceptors, at least in part, extend through the one or more openings.

6. The rearview assembly of claim 1, wherein each of the one more mechanical fasteners extend through one of the one or more openings.

7. The rearview assembly of claim 1, further comprising:
   a mounting assembly having one or more mechanical fastener acceptors;
   a washer disposed in the cavity, the washer operable to receive and support one or more mechanical fasteners, each of the one or more mechanical fasteners received by one of the one or more mechanical fastener acceptors.

8. The rearview assembly of claim 7, wherein the washer is disposed between a circuit board disposed in the cavity and the one or more openings.

9. The rearview assembly of claim 8, wherein each of the one or more mechanical fastener acceptors, at least in part, extend through the one or more openings.

10. The rearview assembly of claim 1, wherein the holder is disposed between the circuit board and the electro-optic element.

11. The rearview assembly of claim 1, wherein the lip protrudes from the mounting surface defining a recess, the protrusion having a depth that corresponds to at least a thickness of the electro-optic element.

12. The rearview assembly of claim 11, wherein the depth corresponds to at least a thickness of the electro-optic element and a foam layer associated with the electro-optic element.

13. The rearview assembly of claim 1, wherein a front of the electro-optic element is entirely visible relative a forward position of the rearview assembly.

14. The rearview assembly of claim 1, wherein a forward edge of the peripheral flange is substantially flush with a front surface of the electro-optic element.

* * * * *